(12) United States Patent
Bucher et al.

(10) Patent No.: US 10,746,233 B2
(45) Date of Patent: Aug. 18, 2020

(54) ENGINE ASSEMBLY

(71) Applicant: Mahle International GmbH, Stuttgart (DE)

(72) Inventors: Michael Bucher, Berlin (DE); Christoph Fiala, Potsdam (DE); Michael Hoetger, Berlin (DE); Hannes Marlok, Leonberg (DE); Lydia Ziegler, Berlin (DE)

(73) Assignee: Mahle International GmbH (DE)

( * ) Notice: Subject to any disclaimer, the term of this patent is extended or adjusted under 35 U.S.C. 154(b) by 70 days.

(21) Appl. No.: 16/001,927

(22) Filed: Jun. 6, 2018

(65) Prior Publication Data

US 2018/0355924 A1    Dec. 13, 2018

(30) Foreign Application Priority Data

Jun. 7, 2017   (DE) .......................... 10 2017 209 567

(51) Int. Cl.
| | |
|---|---|
| *F16D 25/04* | (2006.01) |
| *F16D 13/76* | (2006.01) |
| *F16H 55/36* | (2006.01) |
| *F16D 25/0635* | (2006.01) |
| *F16D 25/08* | (2006.01) |
| *F02G 5/02* | (2006.01) |

(52) U.S. Cl.
CPC ........... *F16D 25/044* (2013.01); *F16D 13/76* (2013.01); *F16D 25/0635* (2013.01); *F16D 25/082* (2013.01); *F16H 55/36* (2013.01); *F02G 5/02* (2013.01)

(58) Field of Classification Search
None
See application file for complete search history.

(56) References Cited

U.S. PATENT DOCUMENTS

| | | | |
|---|---|---|---|
| 2,498,123 A | * | 2/1950 | Hobbs .................... F16D 13/74 192/113.35 |
| 2,589,291 A | | 3/1952 | Sanford |

(Continued)

FOREIGN PATENT DOCUMENTS

| | | |
|---|---|---|
| DE | 10 2012 204 369 A1 | 9/2013 |
| DE | 102012204368 B4 | 2/2015 |
| GB | 2188108 A | 9/1987 |

*Primary Examiner* — Timothy Hannon
(74) *Attorney, Agent, or Firm* — Fishman Stewart PLLC

(57) ABSTRACT

An engine assembly may include an internal combustion engine, an expander coupled to the engine, a pulley rotatably arranged on a shaft of the expander and coupled to the engine, a coupling device including at least one elastic operating element arranged within an operating element accommodation in an axially deformable manner, a drive disk arranged on the shaft between the pulley and the at least one operating element, and a pressure device connected to the operating element accommodation via a fluid line and configured to apply pressure to the operating element accommodation. The at least one operating element may be deformable in an axial direction such that the at least one operating element adjusts the drive disk into force-transfer-ring contact with the pulley when the at least one operating element is deformed by a pressure applied to the operating element accommodation by the pressure device.

19 Claims, 3 Drawing Sheets

(56) References Cited

U.S. PATENT DOCUMENTS

| | | | | |
|---|---|---|---|---|
| 3,189,151 | A * | 6/1965 | Sullivan | F16D 25/044 192/85.08 |
| 3,527,329 | A | 9/1970 | Jordan | |
| 3,545,584 | A * | 12/1970 | Takata | B65H 23/18 192/85.02 |
| 4,227,421 | A * | 10/1980 | Weishew | B65H 54/2821 188/72.4 |
| 4,606,449 | A * | 8/1986 | Lederman | F16D 25/044 192/85.15 |
| 6,578,691 | B1 | 6/2003 | Ashbrook | |
| 8,807,314 | B2 * | 8/2014 | Hebrard | F16D 25/048 192/85.03 |
| 9,360,061 | B2 | 6/2016 | Wiedmann et al. | |
| 9,482,291 | B2 | 11/2016 | Wiedmann et al. | |
| 2001/0011626 | A1 * | 8/2001 | Meyer | F16D 25/083 192/85.51 |
| 2003/0029692 | A1 * | 2/2003 | Rogner | B60K 23/02 192/85.51 |
| 2013/0277968 | A1 * | 10/2013 | Grieser | F01K 23/065 290/2 |
| 2015/0075942 | A1 * | 3/2015 | Wiedmann | F16D 25/0635 192/41 R |
| 2016/0230607 | A1 * | 8/2016 | Tanaka | F02G 5/00 |

* cited by examiner

ENGINE ASSEMBLY

CROSS-REFERENCE TO RELATED APPLICATIONS

This application claims priority to German Patent Application No. DE 10 2017 209 567.9 filed on Jun. 7, 2017, the contents of which are incorporated herein by reference in its entirety.

TECHNICAL FIELD

The present invention relates to an engine assembly comprising an internal combustion engine and an expander, which can be coupled thereto in a force-transferring manner. The invention also relates to a method for starting an expander by means of an internal combustion engine comprising such an engine assembly.

BACKGROUND

A generic engine assembly comprising an internal combustion engine and an expander, which can be coupled thereto in a force-transferring manner, is known from DE 10 2012 204 368 B4. The internal combustion engine thereby serves to drive a first shaft, wherein a fluid-operated coupling arrangement, which can be operated at overpressure or underpressure, can couple a steam engine to a second shaft for driving purposes. A freewheel, which cooperates with the coupling arrangement, is thereby arranged between the first shaft and the second shaft, to transfer a rotational movement of the second shaft to the first shaft in a first operating mode and to be able to realize a free run of the first shaft relative to the second shaft in a second operating mode. To start the expander, a hydraulically or pneumatically operable coupling is used, respectively, which transfers an initial torque, which is required for the starting, to the expander in the closed state.

A further engine assembly is known from DE 10 2012 204 369 A1.

To be able to increase the efficiency of modern motor vehicles, so-called expanders, for example axial piston engines, are increasingly being used in the context of heat recovery systems, wherein such expanders are able to convert heat, which has gone unused to date by an internal combustion engine, for example, into mechanical energy. If such an expander is embodied as axial piston engine, for example, the latter typically requires a first start impulse to be able to be set into rotation. Different methods can be used for this purpose. For example, this can be realized within the expander by means of a mere supply of steam, whereby it is also conceivable in the alternative that a coupling to the internal combustion engine is used and, in response to directly feeding the generated mechanical energy of the expander into the drive train, is brought into an operative connection therewith.

However, it is a disadvantage of the starting devices known from the prior art that they are constructed in a comparatively complex manner and are thus not only technically vulnerable but are also expensive to produce.

SUMMARY

The present invention thus deals with the problem of specifying an improved or at least an alternative embodiment for an engine assembly of the generic type, which overcomes the disadvantages, which are known from the prior art.

According to the invention, this problem is solved by means of the subject matter of the independent claim(s). Advantageous embodiments are the subject matter of the dependent claim(s).

The present invention is based on the general idea of providing a coupling device between an expander and a pulley, which is connected in a force-transferring manner to an internal combustion engine, which has an extremely simple structural setup, and which can thus be produced in a cost-efficient manner. This takes place in the context of an engine assembly according to the invention comprising an internal combustion engine and an expander, which can be coupled thereto in a force-transferring manner, which can for example be embodied as axial piston engine. The above-mentioned pulley is thereby rotatably arranged, for example via a free run, on a shaft of this expander, wherein the pulley is coupled to the internal combustion engine in a force-transferring manner via a belt drive. A drive disk is arranged on the shaft of the expander in a rotationally fixed manner, axially adjacent to the pulley. Provision is also made for a coupling device comprising at least one elastic operating element, which is arranged in an operating element accommodation in an axially deformable manner with respect to the shaft, which operating element accommodation, in turn, is connected to the expander in a rotationally fixed manner. The operating element can thereby be embodied for example as elastic plastic element, which can be bent under pressure, in particular as rubber element or as membrane element. The drive disk itself is thereby arranged between the pulley and the operating element. Provision is furthermore made for a pressure device for applying pressure to the operating element accommodation, for the purpose of which the pressure device is connected to the operating element accommodation via a fluid line. The operating element, together with the operating element accommodation, is thereby embodied in such a way that it is adjusted or deformed, respectively, in the axial direction in response to a corresponding application of pressure to the operating element accommodation by means of the pressure device and thus pushes the drive disk into force-transferring, that is, torque-transferring contact with the pulley. This force-transferring contact can thereby occur by means of an axial adjustment of the drive disk and/or by means of a bending thereof in the direction of the pulley. A resetting or recovery, respectively, of the elastic operating element occurs in response to a pressure relief. Compared to the coupling devices known from the prior art, a comparatively simple coupling of the drive disk to the pulley is possible by means of the engine assembly according to the invention, wherein the internal combustion engine can directly exert an initial torque on the expander and can thus reliably start the latter.

In an advantageous further development of the solution according to the invention, the operating element is an elastic plastic element, in particular a rubber element. A small dynamic friction between the operating element or the operating elements, respectively, and the drive disk can be realized by means of such a plastic element, and the initial torque required to start the axial piston engine can be introduced into the drive disk and thus the expander via the pulley. In addition, such plastic/rubber elements can be produced comparatively cost-efficiently. It goes without saying that the use of plastic membrane elements, which are tightly connected to the control element accommodation and which bend under the application of a pressure, is also conceivable thereby.

Advantageously, the at least one operating element is embodied in a ring-shaped, ring segment-shaped or punctiform manner. In particular a ring-shaped embodiment of the operating element according to the invention thereby represents a particularly preferred embodiment, because the drive disk can be pressed evenly against the pulley by means of such a ring-shaped operating element. It goes without saying that it is also conceivable that the at least one operating element is embodied in a punctiform manner, wherein provision is typically made in this case for a plurality of such operating elements, which are distributed on a circular line in such a way that the drive disk can preferably abut or press against the pulley, respectively, in response to an operation of the operating elements.

In an advantageous further development of the solution according to the invention, the pressure device is produced to generate a gas pressure or to generate a hydraulic pressure. To deform the operating element, an operating medium, for example either air, gas or hydraulic oil, is thus used thereby as fluid. The adjustment of the at least one operating element can thus occur pneumatically or hydraulically. High contact pressures can be transferred to the operating elements in particular by means of hydraulic oil, wherein a comparatively strong initial torque can be transferred from the internal combustion engine to the expander via the pulley.

In a further advantageous embodiment of the solution according to the invention, a friction lining is arranged on the pulley and/or on the drive disk. Such a friction lining increases the friction between the pulley and the drive disk in the case of activated operating elements and thus ensures a torque transfer, which is improved as compared to an embodiment without such a friction lining. Such a friction lining can for example be realized by means of roughened surface or a coating, for example a rubber coating.

In a further advantageous embodiment of the solution according to the invention, a sliding element is arranged between the operating element and the drive disk. Such a sliding element reduces the friction between the already moving drive disk (in the starting sequence) and the activated operating element and thus ensures a small wear on the operating element. Such a sliding element can be statically arranged downstream from the operating element, wherein the sliding element performs the same axial movement as the operating element. A low-friction surface of the sliding element is advantageous and can be realized for example by means of a PTFE material or a coating.

In a further advantageous embodiment of the solution according to the invention, the expander is embodied as axial piston engine. Such axial piston engines have already been tested for many years and are installed diversely in today's heat recovery systems of motor vehicles. The efficiency of the internal combustion engine can be increased significantly by means of such axial piston engines, because in particular thermal energy, which is emitted into the environment unused to date, can now be recovered.

The present invention is further based on the general idea of specifying a method for starting an expander by means of an internal combustion engine comprising an above-described engine assembly, in the case of which an internal combustion engine is started initially and a pressure device then applies pressure, for example a gas pressure or a fluid pressure, to an operating element accommodation. The operating element is deformed in the axial direction to the drive disk by means of this application of pressure and thus pushes said drive disk into a force-transferring, i.e. torque-transferring contact with the pulley. As a result of the torque-transferring contact between the pulley and the drive disk, it is possible that the running internal combustion engine transfers an initial torque to the expander. It goes without saying that it is also conceivable that the pulley on the expander is not connected directly to the internal combustion engine, but indirectly to the internal combustion engine in a torque-transferring manner via a drive train, so that the internal combustion engine, which runs anyways, transfers its torque into the drive train in this case and a corresponding initial torque is introduced by said drive train into the expander in the case of activated operating elements.

Compared to the engine assemblies known form the prior art, a starting of such an expander, which is comparatively cost-efficient yet works reliably, can be attained by means of the method according to the invention and the engine assembly according to the invention.

Further important features and advantages of the invention follow from the subclaims, from the drawings, and from the corresponding figure description by means of the drawings.

It goes without saying that the above-mentioned features and the features, which will be described below, cannot only be used in the respective specified combination, but also in other combinations or alone, without leaving scope of the present invention.

Preferred exemplary embodiments of the invention are illustrated in the drawings and will be described in more detail in the description below, whereby identical reference numerals refer to identical or similar or functionally identical elements.

BRIEF DESCRIPTION OF THE DRAWINGS

In each case schematically.

DETAILED DESCRIPTION

Figure 1:
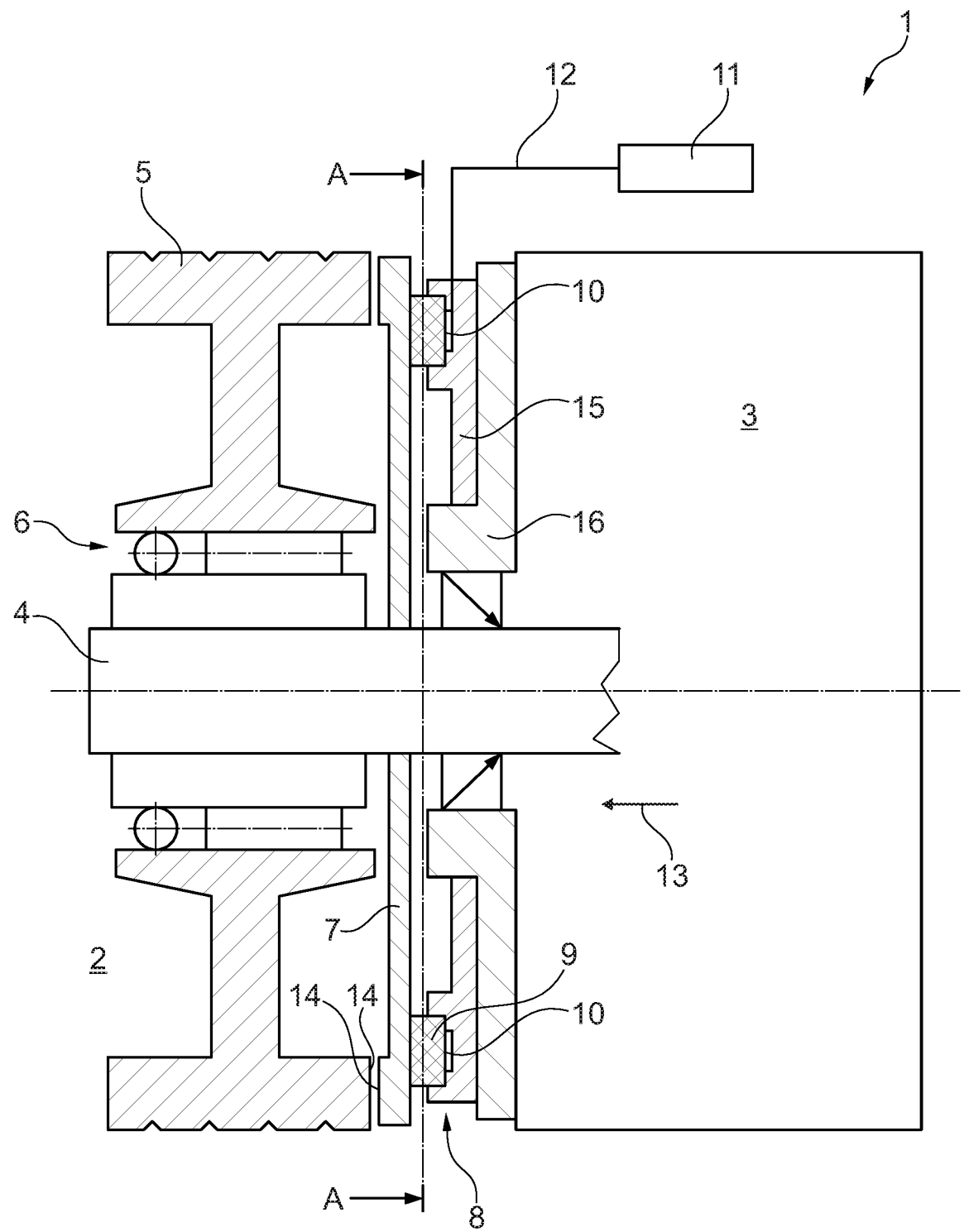
FIG. 1 shows a sectional illustration through an engine assembly according to the invention.
Figure 4:
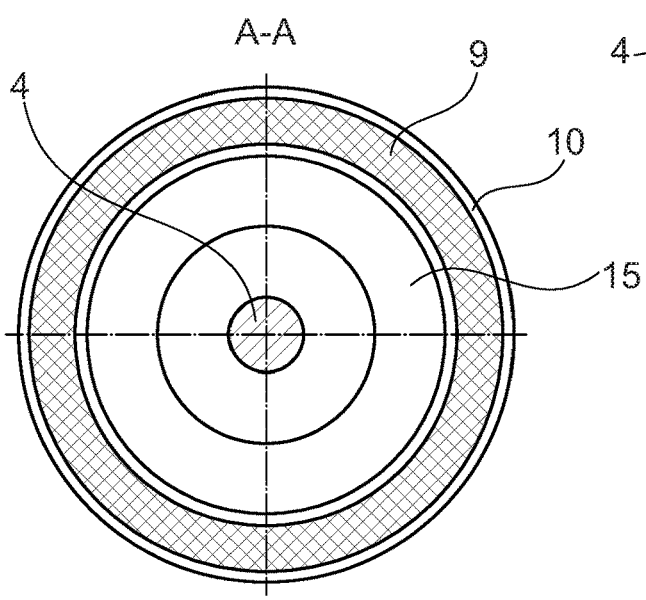
FIG. 4 shows an illustration as in FIG. 3, but comprising a ring-shaped operating element.
Figure 5:
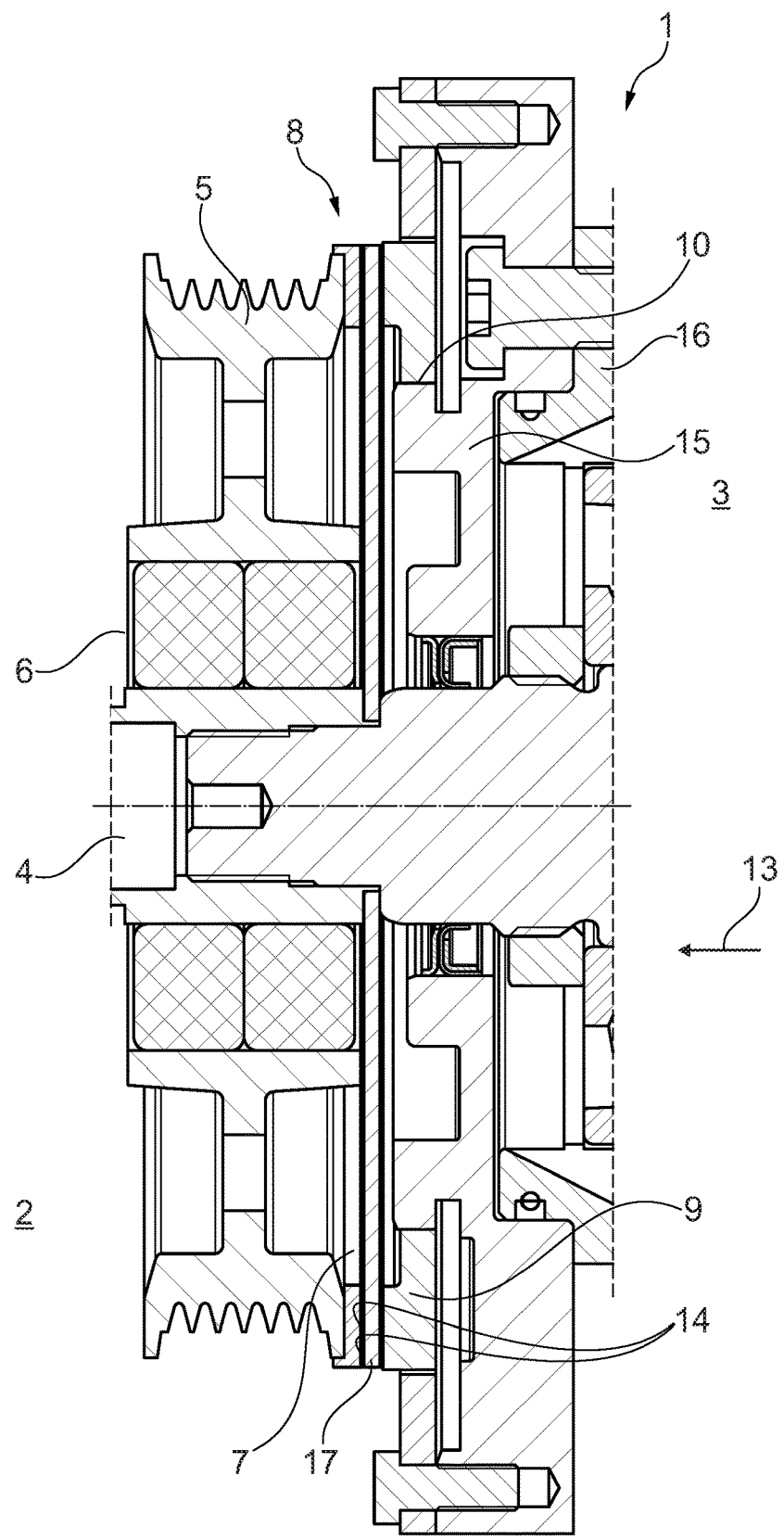
FIG. 5 shows a sectional illustration through an engine assembly according to the invention comprising an additional sliding element.

According to FIGS. 1 and 5, an engine assembly 1 according to the invention comprises an internal combustion engine 2 as well as an expander 3, which can be coupled thereto in a direct or indirect force-transferring manner. The expander 3 can thereby for example be embodied as a so-called axial piston engine. A pulley 5 is thereby rotatably arranged on a shaft 4 of the expander 3, wherein the pulley 5 is coupled to the internal combustion engine 2 via a non-illustrated belt drive in a force-transferring manner, that is, directly or indirectly via a drive train, which is also not shown, in a force-transferring manner. The rotatable arrangement of the pulley 5 on the shaft 4 is attained by means of a corresponding rolling bearing 6, which provides for a free run. A drive disk 7, which is connected to the shaft 4 in a rotationally fixed manner, is arranged on the shaft 4 axially adjacent to the pulley 5. Provision is also made for a coupling device 8 comprising at least one elastically deformable operating element 9 (see also FIGS. 2 to 4), which is arranged in an operating element accommodation 10 in an axially deformable manner with respect to the shaft 4. It goes without saying that the operating elements 9 shown according to FIG. 1 are also conceivably thinner, in particular as membranes. The drive disk 7 is thereby arranged between the pulley 5 and the coupling device 8, that is, the at least one operating element 9. Provision is furthermore made for a pressure device 11, for example a pressure-generating device in the manner of a pressure accumulator or a pump, which is provided to apply pressure to the operating element accommodation 10. For this purpose, the pressure device 11 is connected to the at least one operating element accommodation 10 via a fluid line 12. The at least one operating element 9 is thereby embodied in such a way that it is deformed, for example bent, in the axial direction 13 in response to a corresponding application of pressure to the operating element accommodation 10 by the pressure device 11, and thus pushes or brings the drive disk 7, respectively, into force-transferring contact with the pulley 5, whereby the pulley 5, which was arranged on the shaft 4 so as to rotate freely up to that point in time via the rolling bearing 6, is now connected to the shaft 4 of the expander 3 via the drive disk 7 in a torque-transferring manner. A sliding element 17, which, in response to the application of pressure to the operating element 9 is pushed against the drive disk 7 as a result of curvature of said operating element, can be arranged between the operating element 9 and the drive disk 7 (see FIG. 5). The sliding element 17 can adjoin the operating element 9, for example in a rotationally fixed manner, and can cause a smaller friction than the operating element 9 in response to the starting process (rotation of the drive disk 7), when the sliding element 17 is made for example of PTFE.

The at least one operating element 9 can thereby for example be embodied as elastic plastic element, in particular as rubber element or can at least have rubber.

Figure 2:
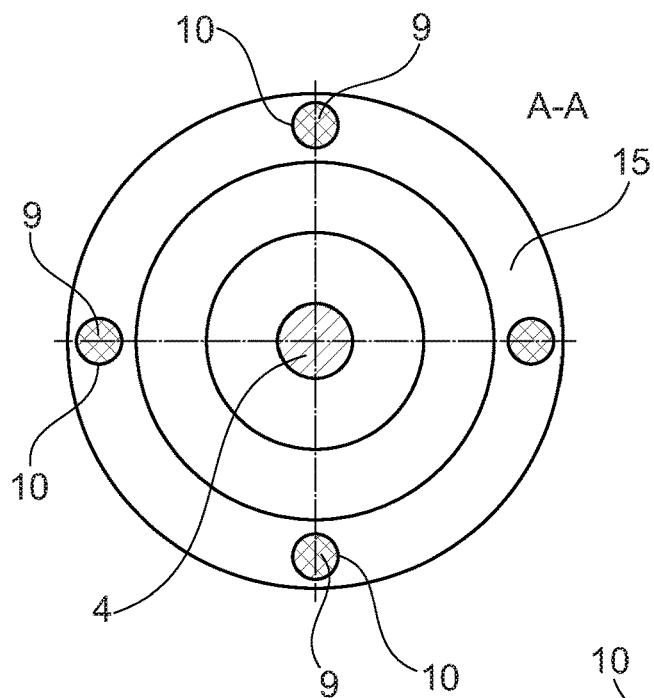
FIG. 2 shows a sectional illustration along the sectional plane A-A in an embodiment comprising punctiform operating elements.
Figure 3:
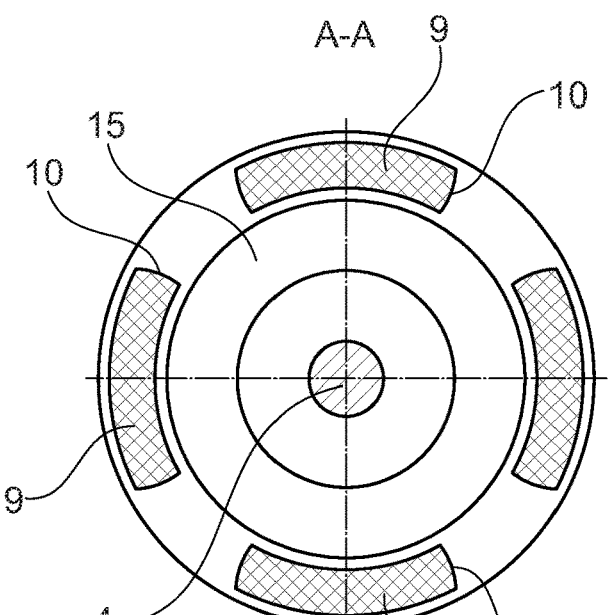
FIG. 3 shows an illustration as in FIG. 2, but comprising circular segment-shaped operating elements.

When looking at the possible embodiments of the at least one operating element 9 according to FIGS. 2 to 4, it can be seen that a total of four operating elements 9, which are embodied in a punctiform manner, are arranged so as to be distributed evenly across the circumference in FIG. 2. In the illustration according to FIG. 3, provision is also made for four operating elements 9, which, however, are embodied in a ring segment-shaped manner. FIG. 4 illustrates an embodiment, which only shows a single operating element 9, which is embodied in the manner of a closed ring.

In response to an application of pressure to the operating element accommodation 10 with gas pressure or hydraulic pressure, the at least one corresponding operating element 9 or the adjoining sliding element 17, respectively, is deformed against the drive disk 7 in the axial direction 13, whereupon said drive disk is brought into abutment and thus into torque-transferring contact with the pulley 5. In this connection, it shall be noted in general that the pulley 5 can also stand for a sprocket wheel or another force-transferring element.

The pressure device 11 can thereby for example be embodied as pressure accumulator, for example as gas tank, which, in turn, is in connection for example with a brake system of a motor vehicle or is used for this purpose. A corresponding valve then needs to be provided in the fluid line 12 for this purpose.

The expander 3 is thereby started as follows by means of the engine assembly 1 according to the invention: first of all, the internal combustion engine 2 is started and runs, so that it can transfer its energy into a drive train. If the expander 3 is to now be started, pressure is introduced by the pressure device 11 via the fluid line 12 into the at least one operating element accommodation 10, whereupon the elastic operating element 9 deforms in the direction of the drive disk 7 and either bends it or moves it towards the pulley 5 in the axial direction and pushes against it. Once this has taken place, a friction lining 14, which is arranged for example on the pulley 5 and/or on the drive disk 7, ensures a torque transfer from the pulley 5 to the drive disk 7 and thus to the shaft 4. The expander can thus be started comparatively easily by means of the engine assembly 1 according to the invention. The control element accommodations 10 can thereby be arranged on an operating element accommodating disk 15, which, in turn, is connected to a housing 16 in a rotationally fixed manner or is directly integrated therein.

The invention claimed is:

1. An engine assembly comprising:
 an internal combustion engine;
 an expander coupled to the engine in a force-transferring manner;
 a pulley rotatably arranged on a shaft of the expander, the pulley coupled to the internal combustion engine via a belt drive in a force-transferring manner;
 a drive disk arranged on the shaft of the expander in a rotationally fixed manner axially adjacent to the pulley;
 a coupling device including an operating element accommodating disk and at least one operating element accommodation, the at least one operating element accommodation structured as a depression disposed in the operating element accommodating disk that opens toward the drive disk, the coupling device further including at least one elastic operating element arranged within the at least one operating element accommodation in an axially deformable manner with respect to the shaft, the drive disk arranged between the pulley and the at least one operating element;
 a pressure device configured to apply a pressure to the at least one operating element accommodation, the pressure device connected to the at least one operating element accommodation via a fluid line; and
 wherein the at least one operating element is deformable in an axial direction such that the at least one operating element pushes the drive disk into force-transferring contact with the pulley when the at least one operating element is axially deformed by the pressure applied to the at least one operating element accommodation by the pressure device.

2. The engine assembly according to claim 1, wherein the at least one operating element is a plastic element configured to be at least one of bendable and deformable.

3. The engine assembly according to claim 1, wherein the at least one operating element is structured in a ring-shaped manner.

4. The engine assembly according to claim 1, wherein the pressure device is configured to provide at least one of a gas pressure and a hydraulic pressure.

5. The engine assembly according to claim 1, wherein the drive disk is structured as a deformable drive disk, and wherein deformation of the at least one operating element bends the deformable drive disk into force-transferring contact with the pulley.

6. The engine assembly according to claim 1, further comprising a friction lining arranged on at least one of the pulley and the drive disk.

7. The engine assembly according to claim 1, further comprising a sliding element arranged between the at least one operating element and the drive disk.

8. The engine assembly according to claim 7, wherein at least one of i) the sliding element is composed at least of a PTFE material and ii) the sliding element includes a low-friction coating.

9. The engine assembly according to claim 7, wherein the sliding element is adjoined to the at least one operating element in a rotationally fixed manner.

10. The engine assembly according to claim 1, wherein the expander is structured as an axial piston engine.

11. The engine assembly according to claim 1, wherein the at least one operating element is a rubber element configured to be at least one of bendable and deformable.

12. The engine assembly according to claim 1, wherein the pulley is arranged on the shaft via a rolling bearing configured to allow free rotation of the pulley when the pulley is not contacting the drive disk.

13. The engine assembly according to claim 1, wherein the at least one operating element accommodation includes a plurality of operating element accommodations disposed circumferentially spaced apart from one another relative to the operating element accommodating disk.

14. The engine assembly according to claim 13, wherein the at least one operating element is structured as a plurality of ring segment-shaped operating elements, and wherein the plurality of ring segment-shaped operating elements are each arranged within a respective one of the plurality of operating element accommodations.

15. The engine assembly according to claim 13, wherein the at least one operating element is structured as a plurality of round operating elements, and wherein the plurality of round operating elements are each arranged within a respective one of the plurality of operating element accommodations.

16. The engine assembly according to claim 1, wherein:
the expander includes a housing; and
the coupling device is coupled to the housing of the expander in a rotationally fixed manner.

17. A method for starting an expander of an engine assembly including an internal combustion engine coupled to the expander in a force-transferring manner, a pulley rotatably arranged on a shaft of the expander and coupled to the internal combustion engine via a belt drive in a force-transferring manner, a drive disk arranged on the shaft in a rotationally fixed manner axially adjacent to the pulley, a coupling device including an operating element accommodation that opens toward the drive disk, the coupling device further including at least one elastic operating element arranged within the operating element accommodation in an axially deformable manner with respect to the shaft, the drive disk arranged between the pulley and the at least one operating element, and a pressure device connected to the operating element accommodation via a fluid line, the method comprising:
applying a pressure to the operating element accommodation via the pressure device;
deforming the at least one operating element in an axial direction via applying the pressure to the operating element accommodation;
pushing the drive disk into force-transferring contact with the pulley via deformation of the at least one operating element;
transferring an initial torque from the internal combustion engine to the expander; and
wherein pushing the drive disk into force-transferring contact with the pulley includes bending the drive disk into contact with the pulley via deformation of the at least one operating element.

18. The method according to claim 17, further comprising one of adjusting and deforming a sliding element into contact with the drive disk, the sliding element arranged between the at least one operating element and the drive disk.

19. An engine assembly comprising:
an internal combustion engine;
an expander coupled to the engine in a force-transferring manner;
a pulley rotatably arranged on a shaft of the expander, the pulley coupled to the internal combustion engine via a belt drive in a force-transferring manner;
a drive disk arranged on the shaft of the expander in a rotationally fixed manner axially adjacent to the pulley;
a coupling device including at least one operating element accommodation that opens toward the drive disk, the coupling device further including at least one elastic operating element arranged within the at least one operating element accommodation in an axially deformable manner with respect to the shaft, the drive disk arranged between the pulley and the at least one operating element; and
a pressure device configured to apply a pressure to the at least one operating element accommodation, the pressure device connected to the at least one operating element accommodation via a fluid line;
wherein the at least one operating element is deformable in an axial direction such that the at least one operating element pushes the drive disk into force-transferring contact with the pulley when the at least one operating element is axially deformed by the pressure applied to the at least one operating element accommodation by the pressure device;
wherein the coupling device further includes an operating element accommodating disk;
wherein the at least one operating element accommodation includes a plurality of operating element accommodations disposed circumferentially spaced apart from one another relative to the operating element accommodating disk;
wherein the at least one operating element is structured as a plurality of ring segment-shaped operating elements; and
wherein the plurality of ring segment-shaped operating elements are each arranged within a respective one of the plurality of operating element accommodations.

* * * * *